Dec. 30, 1924.

B. F. ROEHRIG 1,521,203

SEALING DEVICE

Filed April 13, 1922

Inventor
B. F. Roehrig
By Shepherd & Campbell
Attorneys

Patented Dec. 30, 1924.

1,521,203

UNITED STATES PATENT OFFICE.

BERNARD F. ROEHRIG, OF SAN FRANCISCO, CALIFORNIA.

SEALING DEVICE.

Application filed April 13, 1922. Serial No. 552,429.

*To all whom it may concern:*

Be it known that I, BERNARD F. ROEHRIG, a citizen of the United States, residing at San Francisco, in the county of San Francisco and State of California, have invented certain new and useful Improvements in Sealing Devices, of which the following is a specification.

This invention relates to a vacuum creating apparatus for use in sealing jars in domestic preserving.

It is a well known fact that enormous quantities of fruit and vegetables preserved or attempted to be preserved in the home by home canning methods, spoil; either because the air is imperfectly exhausted from the jar before the jar is sealed or because the jar is so imperfectly sealed that as the fruit or vegetables cool and the pressure within the jar becomes less than atmospheric pressure, outside air finds its way into the jar. The apparatus constituting the subject matter of the present invention is designed to efficiently guard against the foregoing possibilities and to provide a structure by means of which, with a minimum of labor, the housewife may completely exhaust the air from the jar and thereafter perfectly seal the same by atmospheric pressure upon the top.

A primary object of the invention is the provision of an improved device of this nature in the form of a cap adapted to coact directly with the material of the jar to be sealed and characterized by the fact that it has a wide range of application adapting it for use in connection with most, if not all, of the many types of fruit and preserve jars now on the market despite the fact that the several types of jars in use vary considerably in size, shape and capacity.

To be of any commercial value an article of the nature of that constituting the subject matter of the present invention, intended for use by the housewife for domestic preserving purposes, must be adapted to coact with any of the several types of jars already on the market for the reason that it would not be commercially practicable to manufacture a different size vacuum cap for each type of jar manufactured and for the further reason that even if it were commercially practicable to do so it would involve much needless expense to require the housewife to provide a number of these vacuum caps to fit the several types of jars which she might have in hand. Furthermore the making of a number of varying sizes of vacuum caps to do the required work would lead to confusion as to sizes and to loss and disappointment as a result of incomplete exhaustion of atmospheric air from the receptacles to be sealed.

Another object of the invention is to provide a vacuum cap of the character indicated provided with a gauge or other indicating means for indicating the degree of vacuum that has been created within the cap and consequently within the jar, so that the user may know with certainty that the required exhaustion of the air from the receptacle has been accomplished.

Another object of the invention is to provide a simple and efficient form of check valve operating automatically to close during the exhaustion of air from the vacuum cap but capable of being readily opened by the pressure of the thumb when air is to be admitted to the vacuum cap for the purpose of permitting atmospheric pressure to act upon the top or closure of the jar and to render it possible to easily remove the vacuum cap from the jar.

Further objects and advantages of the invention will be set forth in the detailed description which follows.

In the accompanying drawings:

Figs. 1, 2, 3, and 4 are views partly in elevation and partly in vertical section illustrating a vacuum cap and the manner in which the same coacts with the varying types of jars now on the market and illustrating in conjunction therewith the vacuum gauge for indicating the degree of vacuum within the vacuum cap;

Like numerals designate corresponding parts throughout the several figures of the drawings.

Figure 1:
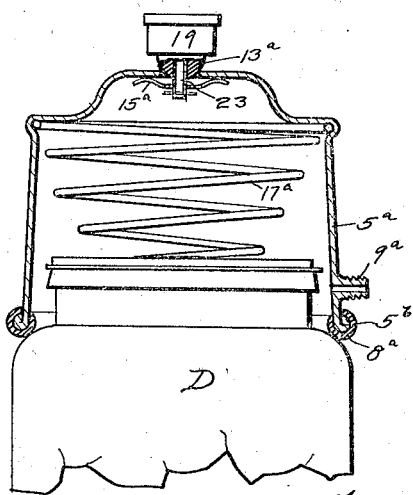
Figure 2:
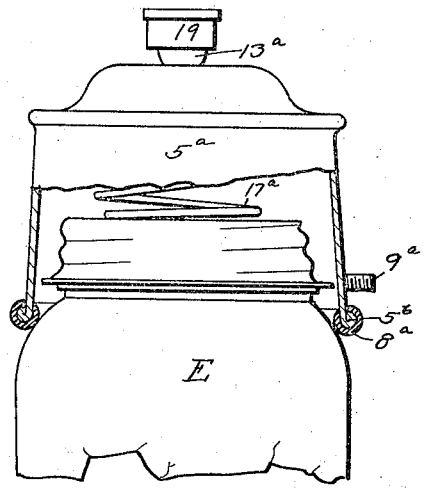

In the drawing $5^a$ designates a cylindrical vacuum cap having a bead $5^b$ about its lower edge which receives and retains a rubber packing ring $8^a$ adapted to coact with the body portion of the jars D—E—F, in Figs.

Figure 3:
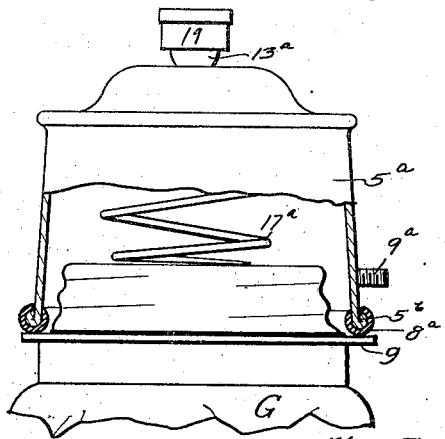
Figure 4:
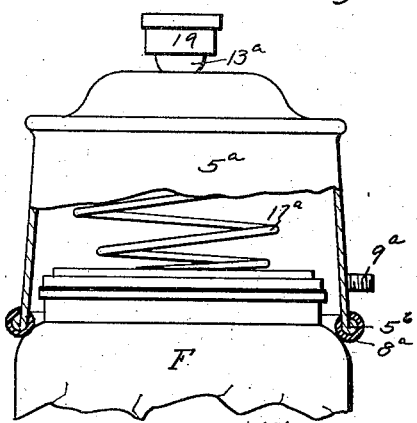
Figure 5:
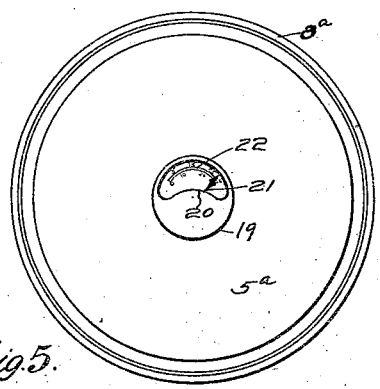
Fig. 5 is a plan view of said cap.

1, 2, and 4 or to coact with a lip or ledge *g* upon the jar G in Fig. 3. In all of these figures a spring 17ª is provided which spring presses upon the cap or top of the jar enough to prevent the entry of any atmospheric air to the interior of the jar during the time that said atmospheric air, is, itself, acting upon said cap to force it in firm engagement with and to compress the gasket or packing C it being understood that initially the cap 5 is placed upon the jar with the ring or gasket 8ª in tight engagement with a part of the jar (in this case the bulge of the jar) below the neck thereof. The cap is held in this position with one hand while with the other hand the operator imparts a few quick strokes to a vacuum pump (not shown) which is to be attached to threaded extension 9ª. After the air has been exhausted from the cap and consequently from the jar cap 19 and valve 13ª are lifted to permit the entry of atmospheric air to the cap. The pressure of the atmospheric air forces the cap into tight engagement with gasket C. In Figs. 1 to 6 inclusive, a valve 13ª has combined therewith a vacuum gauge 19 having a sight opening 20 (see Fig. 5) through which a hand 21 is visible, said hand moving over a scale 22 and indicating the degree of vacuum within the vacuum cap. Communication is established between the gauge 19 and the interior of the vacuum cap through a tube 23, said tube passing through a spring 15ª.

Figure 6:
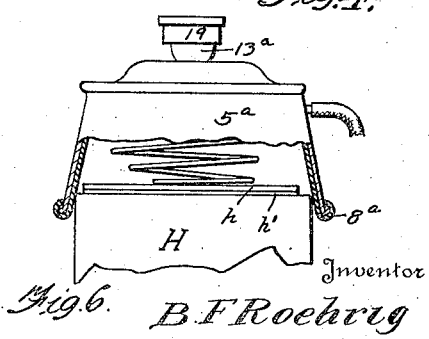
Fig. 6 is a view partly in section and partly in elevation of a modified form of cap.

The structure of Fig. 6 is substantially the same as the structures of Figs. 1 to 4 inclusive but in this case the packing element 8ª has been extended upwardly within the vacuum cap 5ª to form what, in effect, constitutes an interior lining for said vacuum cap. It is to be noted that the vacuum cap tapers somewhat in its height and by lining it with packing material it is adapted to make an air-tight joint at any point in its height at which it happens to contact with the body of a receptacle to be sealed. Thus in the case of a receptacle, such as that indicated at 8 which is of substantially the same diameter throughout its height and wherein the closure or cap *h* and packing rubber *h'* are so nearly equal in diameter to the body of the jar that no space is left upon which to seat a packing ring at the lower edge of the vacuum cap, an air tight joint may be effected by slipping the tapering vacuum cap down over such receptacle until the interior lining makes air-tight contact therewith at whatever point in the height of the vacuum cap such contact may take place. It is apparent that this point of contact will vary according to the diameter of the receptacle 8. Thus it will be seen that if the neck is small and the body of the receptacle is large the device of the present invention will contact with the body of the receptacle at the bulge below the neck. But irrespective of the shape or the size of the receptacle, (within certain limits of course, but which limits exist in the receptacles now upon the market,) an airtight joint may be effected by the device of the present invention for the purposes set forth.

Not only does the use of the apparatus herein shown and described serve the advantageous purposes recited with respect to effecting the sealing of the jars but this method of sealing under vacuum has the further advantage that when it is desired to use the contents of the jar it is only necessary to tear out the rubber packing ring beneath the top of the jar and permit the entry of air to the interior of the jar. This breaks the vacuum within the jar and the top may be readily lifted therefrom without any effort whatever.

It is to be understood that the invention is not limited to the precise construction set forth but that it includes within its purview whatever changes fairly come within either the terms or the spirit of the appended claims.

Having described my invention what I claim is:

1. The combination with a freely liftable hand vacuum cap of the character described having a port formed therein constituting a seat for a valve, of a valve coacting with said port and a vacuum gauge combined with said valve and having communication with the interior of said cap through said valve, said gauge and valve being bodily movable together with respect to the said valve seat, whereby air may be admitted to the interior of the vacuum cap by bodily movement of the valve and the degree of vacuum in said cap may be indicated upon the gauge through the said valve.

2. The combination with a vacuum cap of the character described having a port formed therein, of a valve for closing said port, a tubular stem passing through said valve, a spring engaging said stem and acting to draw the same inwardly and a vacuum gauge having communication with said tubular stem.

3. In combination a freely liftable vacuum cap of the character described capable of bodily manipulation by hand when being placed upon jars to be sealed and comprising a body of inverted cup shape having an unobstructed interior to permit the passage of the neck portion of the jar thereinto, said body being provided with means for attachment of an air exhausting element thereto and having an air inlet port in its top, a valve for closing said air inlet port, a tubular element passing through said valve, a vacuum gauge mounted upon the outer end of the tubular element, a spring with which the inner end of the tubular element is engaged, said spring bearing against the inner side of the top of the body and a packing gasket extending entirely around the lower edge of the said body, in cross section, to adapt it to make contact with surfaces below said edge or inwardly thereof, whereby the vacuum cap is adapted to engage the material of round jars at varying points in the bulge of the jars below the neck portions thereof according to the vertical configuration and diameters of said jars.

In testimony whereof I affix my signature.

BERNARD F. ROEHRIG.